United States Patent [19]

Watson et al.

[11] Patent Number: 4,915,551

[45] Date of Patent: Apr. 10, 1990

[54] GUIDE MECHANISM FOR PRECISION DRILLING AND REAMING

[75] Inventors: John A. Watson, East Lansing; Thomas D. Campbell, Grand Ledge, both of Mich.

[73] Assignee: The Olofsson Corporation, Lansing, Mich.

[21] Appl. No.: 199,150

[22] Filed: May 26, 1988

[51] Int. Cl.$^4$ .................................................. B23B 49/00
[52] U.S. Cl. .................................. 408/72 R; 408/241 B
[58] Field of Search ............... 408/72 R, 72 B, 241 B, 408/241 G; 269/289 R, 290, 294

[56] References Cited

U.S. PATENT DOCUMENTS

| | | | |
|---|---|---|---|
| 1,445,016 | 2/1923 | Golembiewski | 269/289 |
| 2,810,306 | 10/1957 | Romi | 74/826 |
| 3,138,975 | 6/1964 | Saye | 408/97 |
| 4,589,806 | 5/1986 | Rotta, Jr. | 408/72 R |

FOREIGN PATENT DOCUMENTS 543726 2/1932 Fed. Rep. of Germany ........ 408/79
236409 10/1986 Japan ........................ 408/241 G Primary Examiner—Z. R. Bilinsky
Assistant Examiner—Robert Schultz
Attorney, Agent, or Firm—Kisselle, Raisch, Choate, Whittemore & Hulbert

[57] ABSTRACT

Apparatus for precision positioning of guide bushings for roughing tools and for finishing tools so that preformed holes in workpieces may be initially subjected to a roughing operation by roughing tools and subsequently to a finishing operation by finishing tools. The guide bushings are mounted on the ends of carrier arms. The carrier arms encircle a workpiece holder. Each carrier arm is mounted for swinging movement on a pivot axis spaced radially from the workpiece holder. The carrier arms are swingable from a position in which the bushings on one end of the arms are aligned with holes in a workpiece mounted on the workpiece holder, to another position in which the guide bushings on the other end of the arms are aligned with holes in the workpiece. Power is provided for simultaneously swinging all of the carrier arms.

6 Claims, 3 Drawing Sheets

GUIDE MECHANISM FOR PRECISION DRILLING AND REAMING

This invention relates generally to tool guiding apparatus and refers more particularly to apparatus for precision positioning of guide bushings to guide tools, such as drills and reamers, in the removal of stock from a preformed hole in a workpiece.

BACKGROUND AND SUMMARY OF THE INVENTION

A prevalent problem in planetary gear transmissions, especially automotive transmissions, is gear noise. Much of the gear noise is caused by inaccurate positioning of the receiver bores in the planet carrier and by inaccurate bore sizing. These inaccuracies also cause wear and shorten service life.

Single point tools could be used to finish the bores, but they wear relatively rapidly and do not maintain consistent bore size. Reamers are preferred, because they ream to a more consistent bore size and also because the multiple, long cutting lips of a reamer provide a much longer cutting life.

The part to be reamed usually is formed with rough holes which are not concentric with the true hole position desired. This eccentric hole stock creates cutting forces which tend to reflect a reamer out of position. Also, hole locations are affected by temperature growth in the reamer spindles which generate considerable heat from their bearings.

Floating reamers will ream holes to true size, but the eccentric stock will deflect the reamer from its correct position unless reamer guide bushings are placed in close proximity to the entrance of the holes being reamed. These bushings must be retractable to facilitate part loading and unloading. Also, the apparatus for positioning the bushings must be extremely precise.

In order to effect an even more precise hole location, and to extend the wear life of the finish reamers and bushings, it is desirable to pre-drill or ream the part in an initial roughing operation before presenting the holes for final reaming. The initial roughing operation removes excess hole stock and makes the remaining finish stock more nearly concentric with the desired hole location. The initial roughing operation should be very precise to provide optimum hole stock conditions for the final reaming operation.

Since smaller guide bushings are required for roughing than for final reaming, an additional set of guide bushings must be provided.

The initial and final operations should be carried out with the part in the same chuck, because re-chucking could result in changing the locations of the holes.

In addition, the arrangement should be such that temperature changes in the bushing positioning system will have little effect on both the hole-to-part center spacing and hole-to-hole spacing. Preferably, temperature growth should be tangential to the center of the part, thus not affecting radial distances from the center nor disturbing the hole-to-hole circumferential spacing since temperature growth will then move each hole circumferentially nearly equal amounts to maintain the set relationship.

The purpose of this invention is to provide apparatus capable of satisfying the above objectives.

Other objects and features of the invention will become more apparent as the following description proceeds, especially when considered in conjunction with the accompanying drawings.

DETAILED DESCRIPTION

Figure 1:
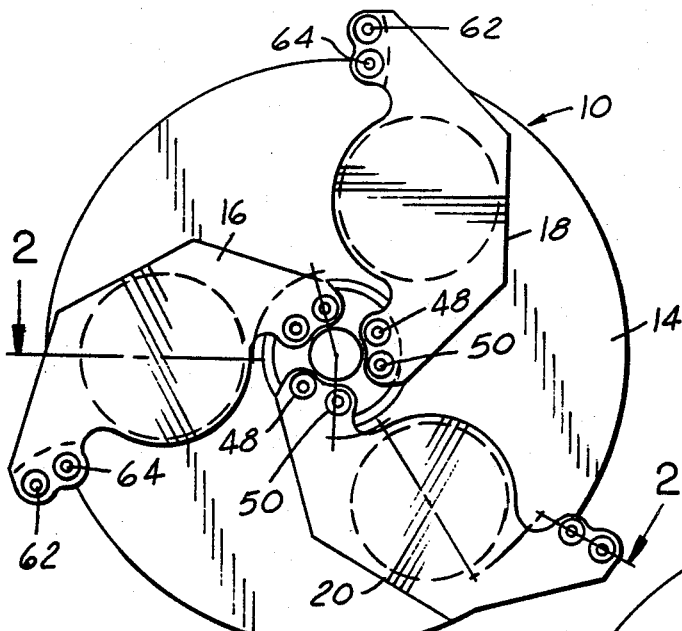
FIG. 1 is a top view of apparatus embodying the present invention.

Referring now more particularly to the drawings, the numeral 10 refers to a circular fixture. A chuck 12 projects upwardly through a center recess 13 in the fixture which opens through the top horizontal surface 14 thereof. A plurality of elongated carrier arms 16, 18 and 20 are mounted on the top surface of the fixture 10 around the chuck 12.

The chuck 12 comprises a vertical arbor 22 having a lower portion 24 of relatively large diameter and an upper pilot portion 26 of smaller diameter which extends above the horizontal top surface of the fixture.

Figure 2:
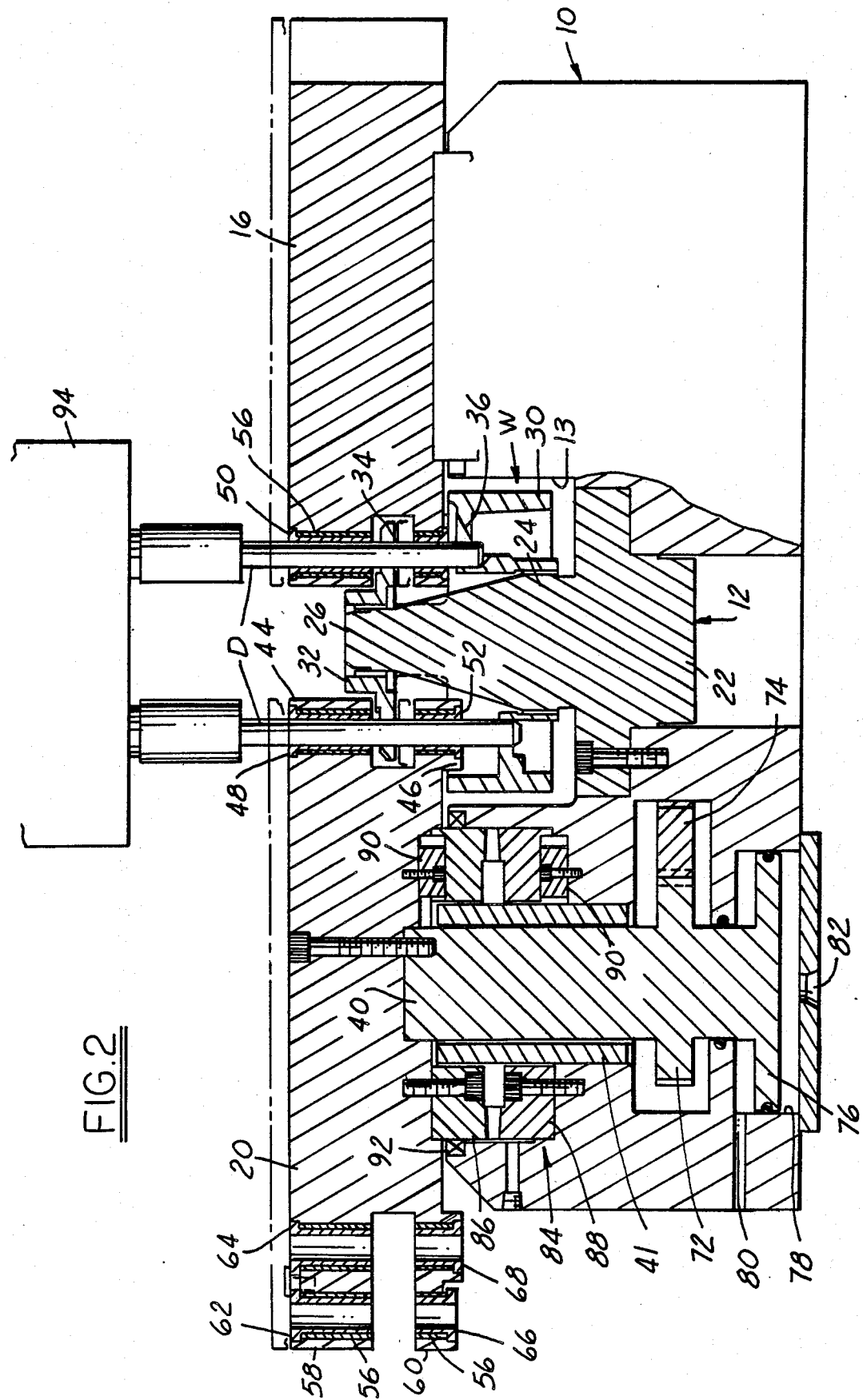
FIG. 2 is a sectional view taken on the line 2—2 in FIG. 1.

The chuck arbor 22 is intended to mount a workpiece W, which in this instance is a planet carrier in an automotive planetary gear transmission. This workpiece or planet carrier W has a lower annular portion 30 of relatively large inside diameter, and an upper annular portion 32 of relatively smaller inside diameter. The workpiece is shown in FIG. 2 mounted on the arbor 22 with its lower portion 30 fitted over the large lower portion 24 of the arbor, and its upper portion 32 fitted over the pilot portion 26 of the arbor.

Figure 3:
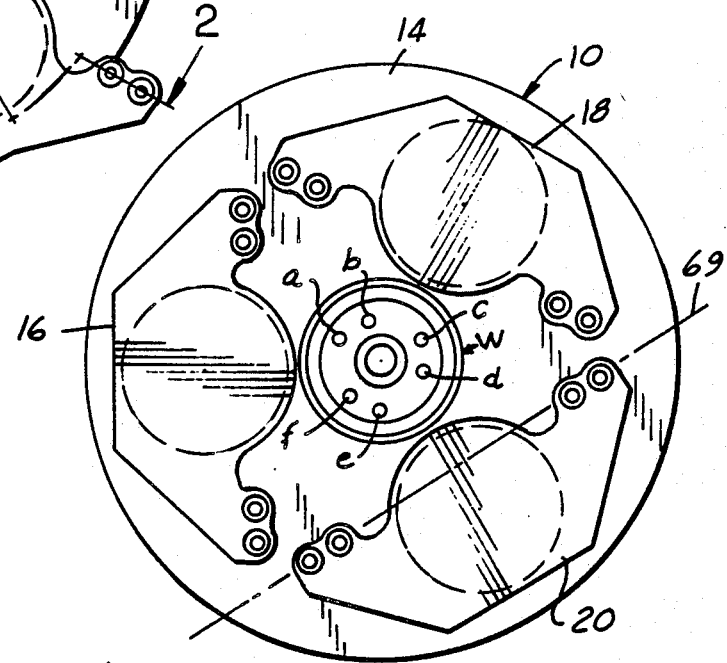
FIGS. 3 and 4 are similar to FIG. 1, but show the parts in different positions.
Figure 4:
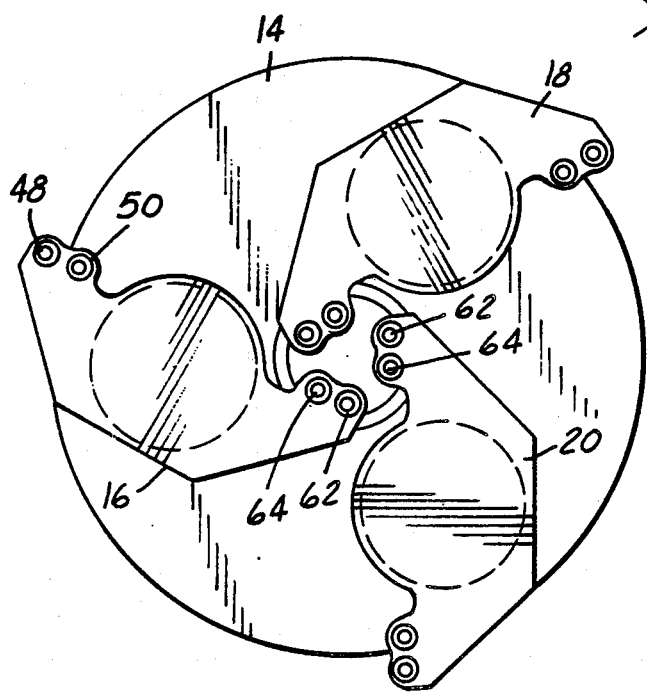

Both the upper and lower portions of the workpiece have peripheral flange portions 34 and 36. These flange portions 34 and 36 are spaced from one other. Each flange portion has a circle of holes, six in this instance. The holes, a, b, c, d, e, and f in the flange portion 34 are respectively aligned with the similarly designated holes in the flange portion 36, so that there are a pair of aligned holes a, a pair of aligned holes b, etc. These holes are equally spaced from the center of the workpiece, but are not equally circumferentially spaced from one another. As seen in FIGS. 1, 3 and 4, the holes in each flange portion are arranged in sets, with the two holes of each set closer together than the spacing between the three sets of holes. Holes a, b constitute one set, c, d another, and e, f still another.

The arbor 22 is a hydraulic expanding arbor. The workpiece is mounted on the arbor by being placed over it as shown in FIG. 2, after which the arbor is expanded to engage the inside diameter of the upper and lower portions to securely grip the workpiece in fixed position. The rotative position of the workpiece is determined by the operator when he mounts it on the arbor.

The carrier arms 16, 18 and 20 are identical in construction. Each carrier arm is mounted above the top horizontal surface of the circular fixture on a vertical shaft 40 for rotation about the vertical axis of the shaft. These axes about which the carrier arms turn are located radially outwardly from the chuck equal distances and are equally spaced from one another an arcuate distance of 120°. The shaft 40 for each carrier arm is supported in the fixture by a bushing 41.

Each carrier arm has at one end upper and lower end portions 44 and 46 spaced apart a distance greater than the thickness of the upper flange portion 34 of the workpiece. The upper end portion 44 has two vertical bushings 48 and 50 which are spaced apart the same distance as the sets of holes a, b, and c, d, and e, f in the workpiece. The lower end portion 46 has two vertical bushings 52 and 54 respectively aligned with the bushings 48 and 50. The bushings 48–54 are fitted into hardened sleeves 56.

Each carrier arm has at the opposite end upper and lower end portions 58 and 60 spaced apart the same distance as end portions 44 and 46. The upper end portion 58 has two vertical bushings 62 and 64 which are spaced apart the same distance as the sets of holes a, b, and c, d, and e, f in the workpiece. The lower end portion 60 has two vertical bushings 66 and 68 respectively aligned with the bushings 62 and 64. The bushings 62–68 are fitted into hardened sleeves 56.

The bushings 48–54 are intended to guide roughing tools, in this instance drills D (other roughing tools such as reamers could be employed) in a preliminary roughing operation on the holes in the workpiece, and are of a somewhat smaller diameter than the bushings 62–68. The bushings 62–68 are reamer bushings intended to guide finishing tools, in this instance reamers R, in a subsequent or final finishing operation.

All four of the aligned pairs of bushings of each carrier arm lie along a straight line 69 (see FIG. 3), which line extends parallel to or in the direction of length of the carrier arm.

The mechanisms for rotating and for raising and lowering the three carrier arms are identical. The upper end of each shaft 40 is rigidly secured to its carrier arm. Each shaft 40 has a gear 72. All three gears mesh with a single ring gear 74, so that operation of the ring gear simultaneously rotates all of the shafts 40 and hence all of the carrier arms. Suitable power means, not shown, are provided for rotating ring gear 74.

A piston 76 on the lower end of each shaft moves in a cylinder 78. Pressure fluid may be admitted to and exhausted from the cylinder above and below the piston through ports 80 and 82, to raise or lower the shaft 40 and hence the carrier arm connected to the shaft. The raised and lowered positions of the arms are shown in FIG. 2 in dotted lines and solid lines, respectively. The ring gear 74 remains engaged with the gears 72 on shafts 40 as the shafts move up and down. Suitable means, not shown, are provided for admitting and exhausting pressure fluid through ports 80 and 82.

A precision tooth coupling set 84 is provided for each carrier arm, to ensure accurate rotative positioning of the carrier arm. The upper ring 86 of the coupling set 84 is secured to the carrier arm by fasteners 87, and the lower ring 88 of the coupling set is secured to the fixture 10 by fasteners 89. The rings 86 and 88 have opposed mating teeth which lock the carrier arm against rotation when engaged. The rings 86 and 88 are keyed to the carrier arm and fixture respectively by zero clearance keys 90 secured by fasteners 91 and 93 to the carrier arm and fixture respectively to prevent change in the coupled position of the carrier arm. The keys 90 locate the rings 86 and 88 in a precise position of rotation, after which the fasteners 87 and 89 are installed. A seal 92 in the fixture 10 encirles and seals against the upper coupling ring 86 to keep dirt out of the coupling set.

The carrier arms 16, 18 and 20 swing from a first operative position shown in FIG. 1, through an intermediate position shown in FIG. 3, to a second operative position shown in FIG. 4. In the intermediate position, the arms are clear of arbor 22 to permit the workpiece to be loaded and unloaded.

In the FIG. 1 position, the drill bushings 48 and 50 at one end of the carrier arms overlie the upper flange portion 34 of the workpiece mounted on the arbor, while the bushings 52 and 54 overlie the lower flange portion 36 of the workpiece. In this position, the upper flange portion 34 of the workpiece extends into the space between the upper and lower end portions 44 and 46 of the carrier arms. This space is wide enough to accommodate the upper flange portion 34 in both the upper and lower positions of the carrier arms. In this FIG. 1 position of the carrier arms, the drill bushings will be vertically aligned with one set of holes in the workpiece, assuming the workpiece is clamped in a proper rotative position. The bushings are in close proximity to the entrance of the holes. Also, in this position of each carrier arm, the straight line 69 drawn through all four of its aligned pairs of bushings extends lengthwise of the carrier arm and substantially tangent to the circle of holes in the workpiece.

In the FIG. 4 position, the reamer bushings 62 and 64 at the opposite end of the carrier arms overlie the upper flange portion 34 of the workpiece mounted on the arbor, while the bushings 66 and 68 overlie the lower flange portion 36 of the workpiece. In this position, the upper flange portion 34 of the workpiece extends into the space between the upper and lower end portions 44 and 46 of the carrier arms. This space is wide enough to accommodate the upper flange portion 34 in both the upper and lower positions of the carrier arms. In this FIG. 4 position of the carrier arms, the reamer bushings will be vertically aligned with one set of holes in the workpiece, assuming the workpiece is clamped in a proper rotative position. The bushings are in close proximity to the entrance of the holes. Also, in this position of each carrier arm, the straight line 69 drawn through all four of its aligned pairs of bushings extends lengthwise of the carrier arm and substantially tangent to the circle of holes in the workpiece.

Mounted above the fixture 10 is a drill head 94 and a reamer head 96. The drill head 94 is a floating tool holder for six drills D arranged in a circular pattern corresponding to the pattern of holes in the workpiece. The reamer head 96 is a floating tool holder for six reamers R arranged in the same pattern as the drills. The heads 94 and 96 are mounted on vertical feed slides 98 and 100. Suitable power means, not shown, move the two heads up and down independently of each other.

Figure 5:
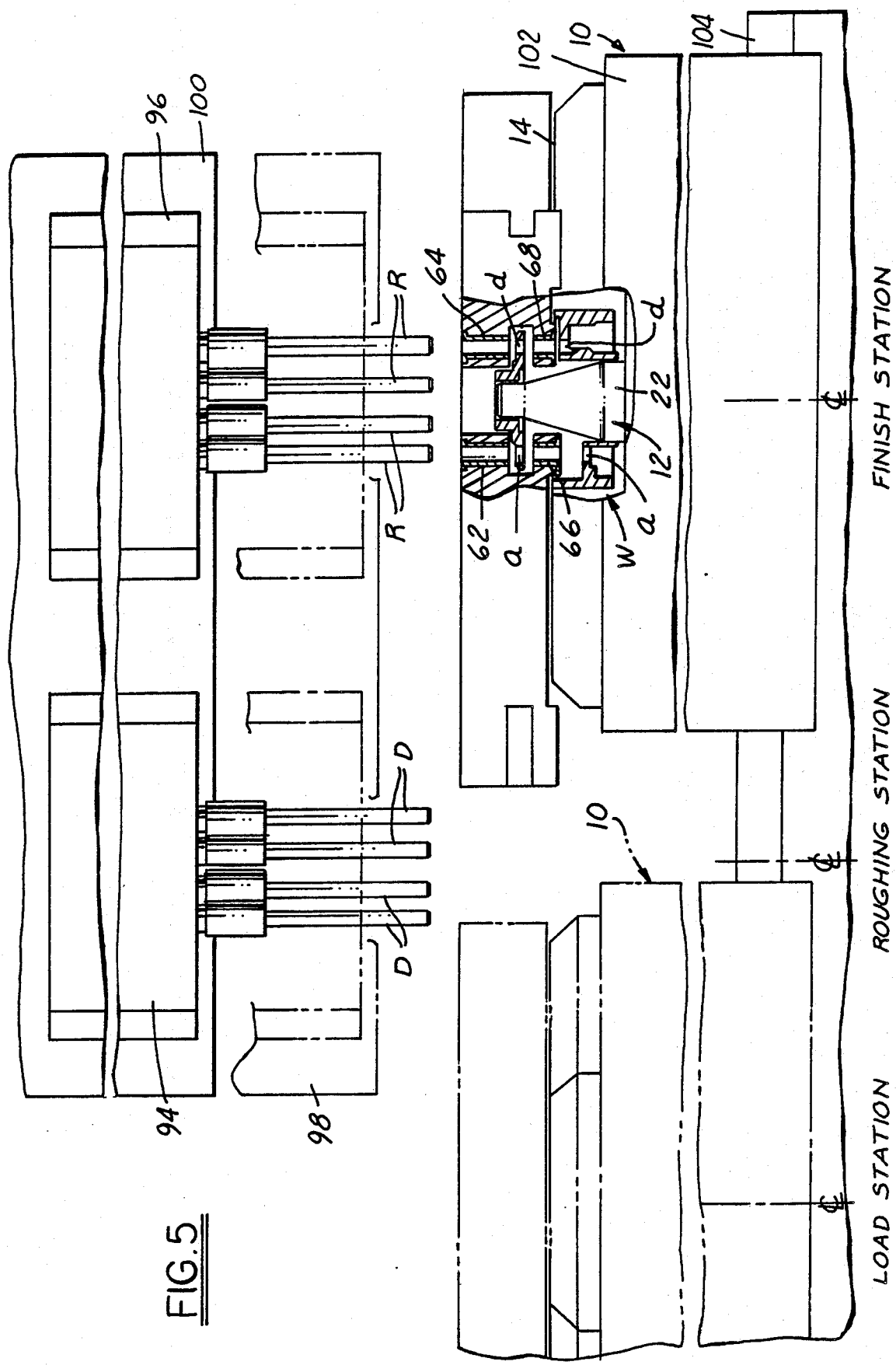
FIG. 5 is a side view showing the apparatus on a shuttle slide beneath a drill head and a reamer head.

The fixture 10 is mounted on a shuttle 102 which slides on machine base 104 from a loading and unloading station, to a roughing station, and to a finishing station (See FIG. 5).

In operation, the fixture 10 is moved to the loading station, the carrier arms 16, 18 and 20 are raised to uncouple them and swung to their intermediate positions shown in FIG. 3, and the workpiece W is placed over arbor 22. The workpiece is manually turned on the arbor to a rotative position corresponding to the pattern of the drills D in the drill head. Then, the arms are simultaneously swung to the FIG. 1 position in which the drill bushings 48–54 on each arm are aligned with one set of holes in the workpiece. In other words, the drill bushings on one arm are aligned with the set of holes a, b, the drill bushings on another arm are aligned with the set of holes c, d, and the drill bushings of the third arm are aligned with the set of holes e, f. A pin may be inserted through the bushings and aligned workpiece holes for more accurate alignment. Then the arbor 22 is expanded to grip the workpiece, and the arms are lowered to lock them in the FIG. 1 position by means of the tooth coupling sets 84.

Thereafter, with the drill head 94 in the elevated position shown in FIG. 5, the fixture is moved to the roughing station under the drill head. The drills D are then driven in rotation and the drill head is lowered to advance the drills through the aligned drill guide bushings and through the holes in the workpiece. Exact alignment of the drills and guide bushings is not required because the floating tool holder allows for minor misalignment. The drill head is raised to withdraw the drills, rotation of the drills is stopped, and the fixture is then moved to the finishing station under the reamer head 96. At this time, the reamer head is in its up position.

The carrier arms are raised to uncouple them and simultaneously swung to the FIG. 4 position in which the reamer bushings 62–68 on each arm are aligned with one set of holes in the workpiece. The carrier arms are lowered to lock them in the FIG. 4 position.

The reamers R are then driven in rotation and the reamer head lowered to advance the drills through the aligned reamer guide bushings and through the holes in the workpiece. Again, exact alignment of the reamers and guide bushings is not required because the floating tool holder allows for slight misalignment. The reamer head is raised to withdraw the reamers, and the reamers are stopped.

Thereafter, the fixture is moved to the loading station where the arms are raised and then simultaneously swung to the intermediate position, permitting the workpiece to be unloaded after the release of the arbor.

We claim:

1. Apparatus for precision guiding roughing tools and finishing tools so that preformed holes in a workpiece may be initially subjected to a roughing operation by precision guided roughing tools and thereafter to a finishing operation by precision guided finishing tools, said apparatus comprising a workpiece holder for mounting the workpiece in a fixed position, bushing support and positioning means comprising a plurality of elongated bushing carrier arms, each said carrier arm having a first end and a second end, means for mounting said carrier arms at an intermediate point in the length of each for swinging movement on pivot axes spaced apart arcuately around said workpiece holder and spaced laterally outwardly from said workpiece holder, a roughing guide bushing mounted on each carrier arm adjacent said first end thereof and a finishing guide bushing mounted on each carrier arm adjacent said second end thereof, said carrier arms being capable of swinging to a first operative position in which said roughing guide bushings are aligned with said preformed holes in the mounted workpiece, to a second operative position in which said finishing guide bushings are aligned with said preformed holes in the mounted workpiece, and to a retracted position in which said carrier arms are withdrawn clear of the workpiece holder permitting loading and unloading of the workpiece, releasable locking means for locking each carrier arm selectively in said first and second operative positions, and means for swinging said carrier arms in unison.

2. Apparatus as defined in claim 1, wherein said locking means for locking each carrier arm comprises a first coupling member secured to the latter and a second coupling member engageable with said first coupling member, means mounting said second coupling member in fixed position adjacent said first coupling member, and means for moving said carrier arms along their pivot axes in opposite directions to engage and disengage said first and second coupling members.

3. Apparatus for precision guiding roughing tools and finishing tools so that holes which have been preformed in peripheral portions of an annular workpiece at points spaced from the center thereof may be initially subjected to a roughing operation by precision guided roughing tools and thereafter to a finishing operation by precision guided finishing tools, said apparatus comprising a workpiece holder for mounting the workpiece in a fixed position, a bushing support and positioning means comprising a plurality of elongated bushing carrier arms, each said carrier arm having a first end and a second end, means mounting said carrier arms at an intermediate point in the length of each for swinging movement on pivot axes spaced apart arcuately around said workpiece holder and spaced radially outwardly from said workpiece holder, a roughing guide bushing mounted on each carrier arm adjacent said first end thereof and a finishing guide bushing mounted on each carrier arm adjacent said second end thereof, said carrier arms being capable of swinging to a first operative position in which said roughing guide bushings are aligned with said preformed holes in the mounted workpiece, to a second operative position in which said finishing guide bushings are aligned with said preformed holes in the mounted workpiece, and to a retracted position in which said carrier arms are withdrawn clear of the workpiece holder permitting loading and unloading of the workpiece, releasable locking means for locking each carrier arm selectively in said first and second positions, and means for swinging said carrier arms in unison.

4. Apparatus as defined in claim 3, wherein said locking means for locking each carrier arm comprises a first coupling member secured to the latter and a second coupling member engageable with said first coupling member, means mounting said second coupling member in fixed position adjacent said first coupling member, and means for moving said carrier arms along their pivot axes in opposite directions to engage and disengage said first and second coupling members.

5. Apparatus as defined in claim 3, wherein the construction and arrangement of said workpiece holder and carrier arms are such that when said carrier arms are in said first or second operative position a straight line extending generally lengthwise of each carrier arm through the bushing thereof which is aligned with a workpiece hole is approximately tangent to a circle through the last-mentioned hole whose center coincides with that of the workpiece.

6. Apparatus as defined in claim 5, wherein said straight line extending generally lengthwise of each carrier arm extends through both of the bushings mounted thereon.

* * * * *